United States Patent [19]
Torgerson et al.

[11] Patent Number: 5,445,357
[45] Date of Patent: Aug. 29, 1995

[54] PIPE CONNECTING STRUCTURE TO BE USED FOR A MILK DELIVERY PIPE

[75] Inventors: Kevin L. Torgerson, Holmen; Kevin M. Keefe, LaCrosse; David A. Schultz, Holmen, all of Wis.; Minoru Matsuzawa, Nagano, Japan

[73] Assignee: Orion-Babson Co., Ltd., Nagano, Japan

[21] Appl. No.: 212,895

[22] Filed: Mar. 15, 1994

[30] Foreign Application Priority Data

| Mar. 31, 1993 | [JP] | Japan | 5-021336 U |
| Mar. 31, 1993 | [JP] | Japan | 5-021337 U |
| Mar. 31, 1993 | [JP] | Japan | 5-097125 |

[51] Int. Cl.⁶ .................................... F16K 51/00
[52] U.S. Cl. ............................ 251/146; 251/143; 251/148; 119/14.01
[58] Field of Search ............ 251/148, 145, 146, 143; 119/14.01

[56] References Cited

U.S. PATENT DOCUMENTS

| 2,881,010 | 4/1959 | Bouma | 251/146 |
| 2,949,276 | 8/1960 | Merritt et al. | 251/146 |
| 2,987,294 | 6/1961 | Merritt et al. | 251/146 |
| 3,011,755 | 12/1961 | Babson | 251/146 |
| 3,272,471 | 9/1966 | McCullah | 251/146 |
| 3,476,357 | 11/1969 | Lee | 251/146 |
| 3,480,252 | 11/1969 | Simons | 251/146 |
| 3,545,719 | 12/1970 | Shulick. | |
| 4,261,291 | 4/1981 | Wakui et al. | |
| 4,366,772 | 1/1983 | Panock. | |

FOREIGN PATENT DOCUMENTS

| 49-26148 | 7/1974 | Japan. |
| 58-164460 | 11/1983 | Japan. |
| 2027575 | 7/1982 | United Kingdom. |

Primary Examiner—A. Michael Chambers
Attorney, Agent, or Firm—Steven M. Rabin

[57] ABSTRACT

A pipe connecting structure is constituted by a milk tap having an aperture to be aligned with a corresponding opening arranged at the top of a milk delivery pipe, and a slide valve for opening and closing said aperture, and a plug-in metal fitting removably fitted to said milk tap and including an elbow pipe. The slide valve includes a slide valve carriage having a substantially circular valve sliding hole and transversal collar insertion holes disposed along the lateral sides of the valve sliding hole, a pair of guide pins projecting outwardly from the bottoms of the respective collar insertion holes, a pair of guides projecting outwardly in a direction opposite to that of the guide pins, a pair of holders for slidably holding the guides collars with tapered leading ends fitted to the respective guide pins of the valve carriage, and coil springs arranged between the collars and the bottoms of the collar insertion holes.

7 Claims, 9 Drawing Sheets

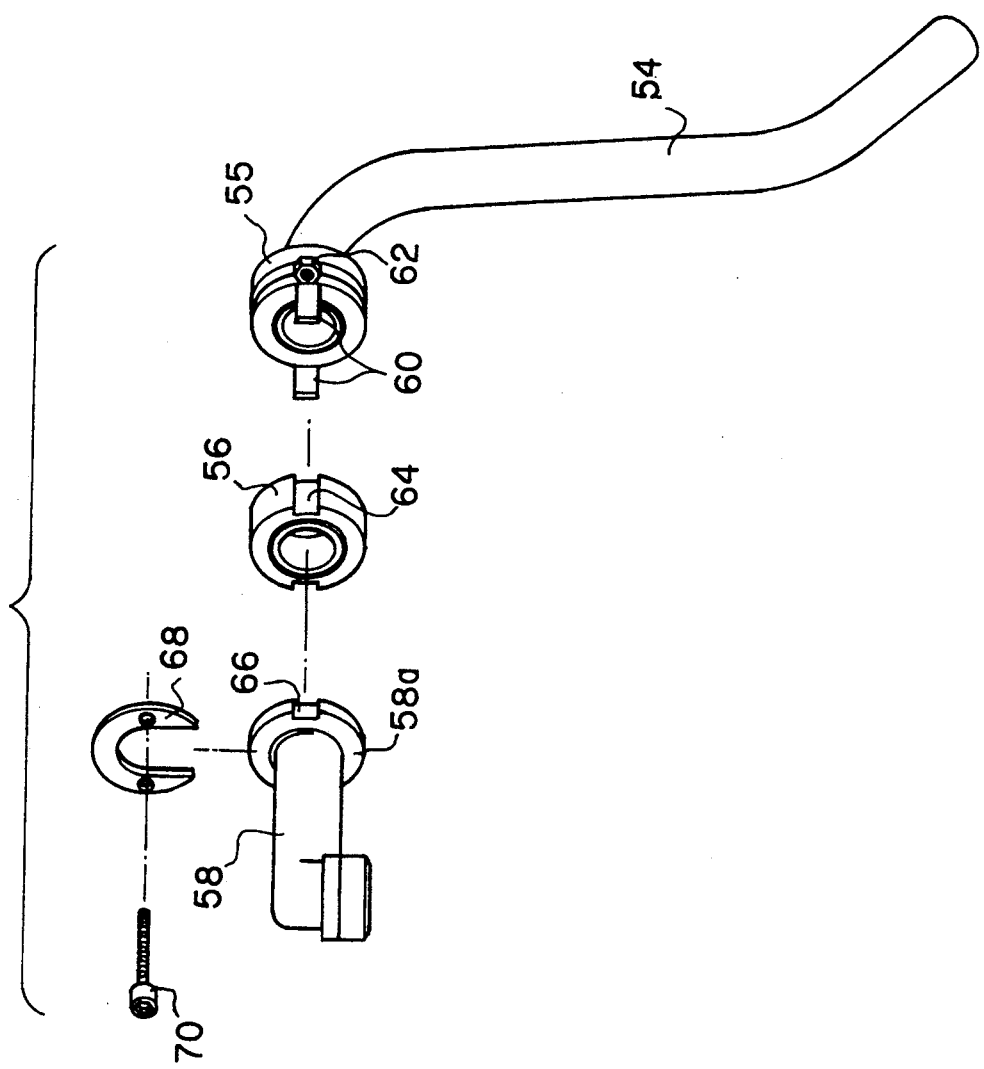

PIPE CONNECTING STRUCTURE TO BE USED FOR A MILK DELIVERY PIPE

BACKGROUND OF THE INVENTION

1. Field of the Invention

This invention relates to a pipe connecting structure to be used for a milk delivery pipe of a pipe line milker system, said structure comprising a milk tap and a plug-in metal fitting.

2. Prior Art and the Objects of the Invention

Any known milk tap to be used for a milk delivery pipe in a pipeline milker system has a circular aperture having a diameter which is the same as that of the milk delivery pipe in order to secure an airtight connection of the pipe and the milk tap.

However, two types of milk delivery pipes are currently marketed, those with a larger diameter and those with a smaller diameter, and selectively used depending on the size and scale of the facility. Hence suppliers of milk taps are required to market two different types of milk taps, those matching with larger diameter pipes and those matching with smaller diameter pipes.

Then, the milk tap manufacturer always has to have two different types of molds at hand in order to produce two different types of milk taps. Obviously, it is more costly and time consuming to manufacture milk taps of two different types than to manufacture milk taps of the same type.

In view of this problem of the prior art, it is therefore an object of the present invention to provide an adapter that allows a single milk tap to be used with milk delivery pipes of different diameters.

As for the slide valve of a milk tap, there is known a type having a main body to be fitted to a pair of rods held by holders arranged at opposite lateral sides of the aperture of the milk tap, the main body containing in it a cylindrical valve provided with a semispherical bottom. Spring coils are arranged between the holders and the valve main body, and a pair of projections is arranged at opposite sides of the aperture of the milk tap in such a way that each of the projections contact with the semispherical bottom only at a point.

Although the designer of the slide valve having a configuration as described above must obviously have intended to prevent it from touching the milk tap except, on a surface area surrounding the aperture thereof when the valve is closed or opened, the valve slightly but inevitably touches the projections at the bottom. It is also disadvantageous that the slide valve for slidingly closing and opening the aperture of the milk tap is made heavy because it relies for sliding motion on its own weight and the negative pressure of the milk delivery pipe connected to it.

In view of the above identified problems of the prior art, it is another object of the invention to provide a slide valve to be used for a milk tap that is lightweight and does not touch the milk tap at the bottom.

Finally, as for the plug-in metal fitting of the milk tap, there is known a type disclosed in Japanese Utility Model Application Publication No. 49-26148 and Japanese Utility Model Application Laid-Open No. 58-164460 comprising a pipe which is brought into contact with the periphery of a corresponding aperture of a milk delivery pipe by sliding the fitting on a metal connector (milk tap) fitted to the milk delivery pipe.

Such a metal fitting requires two different actions of inserting its pipe horizontally into a milk delivery pipe and then sliding it vertically on a milk tap fitted to the milk delivery pipe and these actions have to be carried out successively in order to bring the fitting into the right position. Additionally, the pipe of the fitting has to be securely fit into the aperture of the milk delivery pipe by relying on the vacuum in the delivery pipe.

However, to carry out two different actions successively is obviously an cumbersome operation and, while the metal fitting relies on the vacuum in the milk delivery pipe for its connection with the periphery of a corresponding aperture of the milk delivery pipe, only a short distance is normally allowed for the metal fitting to move into the milk delivery pipe because of structural limitations. Therefore, there has been a demand for a connector assembly that can urge the pipe of the metal fitting to the corresponding aperture of the milk tap.

SUMMARY OF THE INVENTION

According to an aspect of the invention, the above objects are achieved by providing an offset adapter that comprises a substantially cylindrical body having an outer diameter equal to the diameter of the pipe inlet port of a matching milk tap, a circular milk delivery pipe inlet port disposed on a lateral side of said body and off the axis and toward the periphery thereof and having a desired diameter and an aperture disposed at the center of the top of said body, said body being formed by an upper member and a lower member, one of said members having ridges disposed on the longitudinal ends of the member abutting the corresponding ends of the other member, said other member having grooves disposed on the longitudinal ends of the member for receiving said ridges. The cylindrical body of the offset adapter comprises substantially parallel outward ridges projecting from the outer peripheral surface of the body designed to be received in corresponding grooves formed on the inner wall surface of the milk tap to ensure a secure engagement of the adapter and the milk tap.

According to another aspect of the invention, there is provided a slide valve of a milk tap having an aperture to be aligned with an upper opening of a milk delivery pipe, said slide valve comprising a slide valve carriage having a substantially circular valve sliding hole disposed at the lower center and transversal collar insertion holes bored from a side toward the other side thereof and disposed along the lateral sides of the valve sliding hole, a pair of guide pins projecting outwardly from the bottoms of the respective collar insertion holes, a pair of guides projecting outwardly from said other side in a direction opposite to that of said guide pins, a pair of holders disposed oppositely and adjacent to the aperture of the milk tap for slidably holding said guides and guide pins and collars fitted to the respective guide pins of the valve carriage, coil springs being respectively arranged between the collars and the bottoms of the collar insertion holes, the leading ends of said collars disposed close to the carriage being tapered, a cylindrical bottomed valve being inserted into said valve sliding hole, said valve being provided with lugs at opposite sides thereof, the highest points of said collars fitted to said guide pins being located above the lowest points of the respective lugs, said lugs disposed at opposite sides of said cylindrical valve abutting the respective collars fitted to said guide pins when moved horizontally with the carriage.

According to still another aspect of the invention, there is provided a plug-in metal fitting to be used for connecting a milk tap having an aperture at the top thereof to a milk delivery pipe by simply pushing it horizontally in a direction perpendicular to the axis of the milk delivery pipe until it abuts the pipe, said metal fitting comprising a milk tube having an end to be connected to milking claws and the other end to be connected to an elbow pipe by way of a ring-shaped packing, said elbow being inclined downward by 5° from the horizontal axis of the milk delivery pipe when connected to said metal fitting.

BRIEF DESCRIPTION OF THE DRAWINGS

FIG. 16 is an exploded perspective view of a milk delivery pipe and an elbow pipe, illustrating the structural features of the latter.

DETAILED DESCRIPTION OF THE PREFERRED EMBODIMENT

Figure 1:
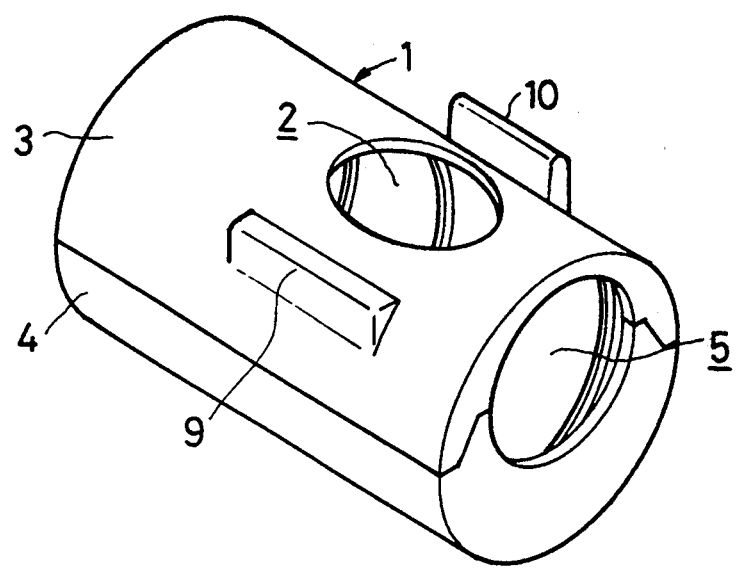
FIG. 1 is a schematic perspective view of a preferred embodiment of an offset adapter according to the invention.

FIG. 1 shows a schematic perspective view of a preferred embodiment of an adapter according to the present invention, which is in fact realized in the form of a cylindrical offset adaptor 1 to be fitted to a milk delivery pipe. The cylindrical adaptor 1 comprises a semicylindrical upper member 3 having an aperture 2 at the center of the top thereof and a matching semicylindrical lower member 4, which, when assembled, produce a circular milk delivery pipe inlet port 5 located on a lateral side of and off the axis of the cylindrical adapter 1 toward the periphery of the upper member 3 to receive a milk delivery pipe and allow it to run deep into the adaptor 1.

Figure 2:
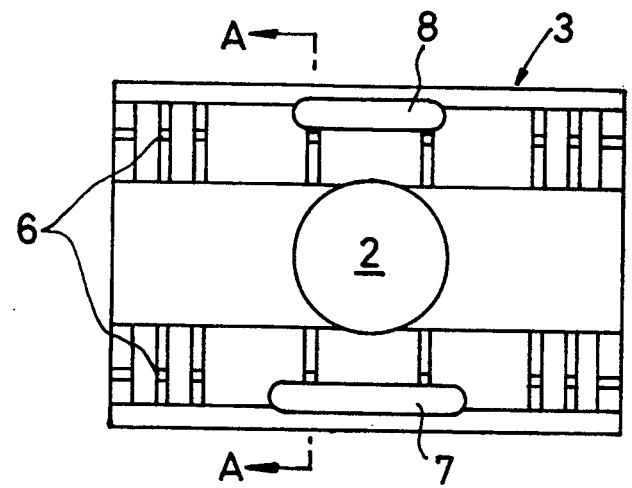
FIG. 2 is a bottom view of the upper member of the offset adapter of FIG. 1.
Figure 3:
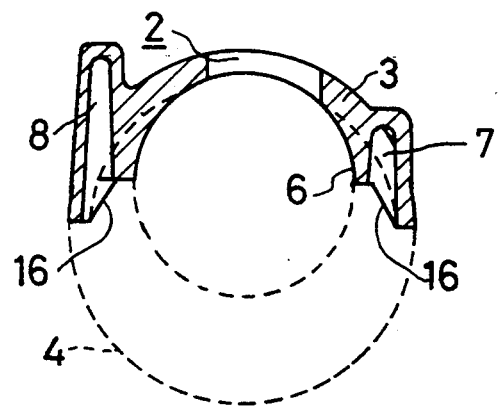
FIG. 3 is a sectional view of the upper member of FIG. 2 taken along line A—A.
Figure 4:
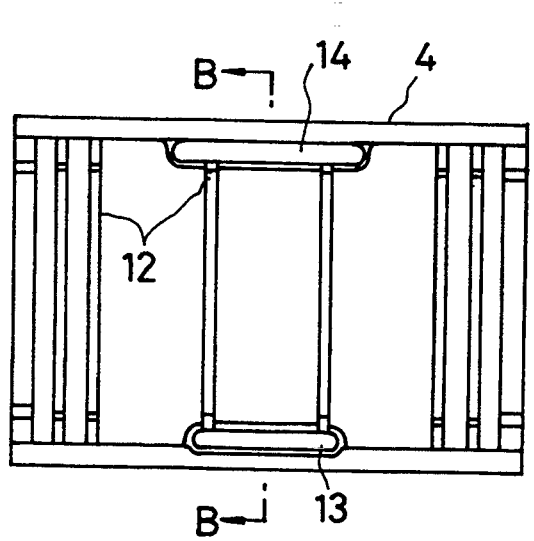
FIG. 4 is a plan view of the lower member of the offset adapter of FIG. 1.
Figure 5:
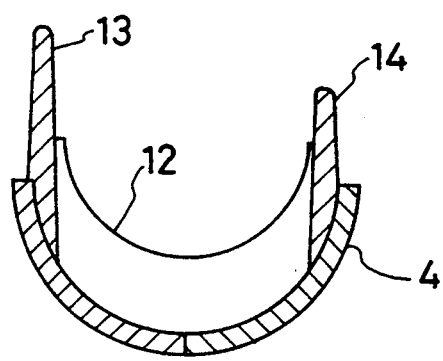
FIG. 5 is a sectional view of the lower member of FIG. 4 taken along line B—B.
Figure 6:
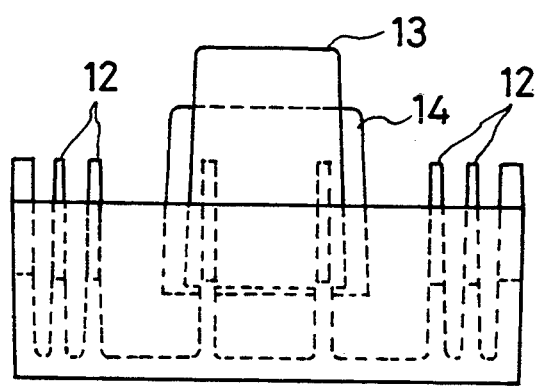
FIG. 6 is a front view of the lower member of FIG. 4.

As seen in FIGS. 2 and 3, the upper member 3 is hollow and provided with a plurality of circumferential ribs 6 radially and inwardly extending from the inner surface of the member toward the outer peripheral surface of the milk delivery pipe running in the adapter and a pair of grooves 7 and 8 oppositely disposed along the axis of the adaptor on the inner surface of the upper member 3 for receiving corresponding ridges of the lower member 4, said grooves 7 and 8 outwardly forming respective ridges 9 and 10 projecting from the outer surface of the upper member 3.

Like the upper member 3, the lower member 4 is also hollow and provided with a plurality of circumferential ribs 12 radially and inwardly extending from the inner surface of the member toward the outer peripheral surface of the milk delivery pipe introduced into the adapter and a pair of ridges 13, 14 oppositely disposed on the respective longitudinal ends of the member which are designed to abut the corresponding longitudinal ends of the upper member when said pair of ridges 13, 14 are received in the respective grooves 7, 8 of the upper member.

Figure 7:
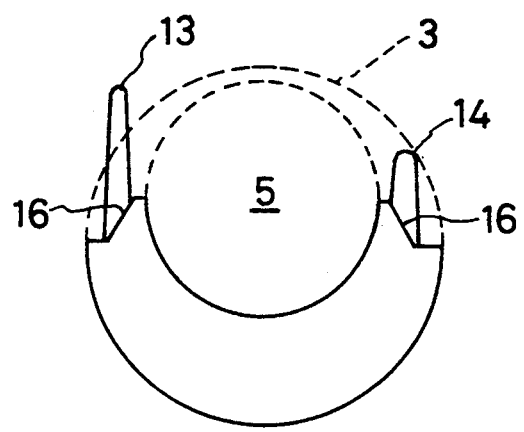
FIG. 7 is a side view of the lower member of FIG. 4 taken from the right side thereof.

Referring now to FIGS. 3 and 7, note that the side wall of the cylindrical adapter 1 having the milk delivery pipe inlet port 5 carries slopes 16, 16 formed by connecting respective points of the horizontal center line of the circular side wall and corresponding points of the horizontal center line of the circular inlet port 5 in order to ensure a good engagement of the upper and lower members 3 and 4. In the above embodiment, the slopes 16, 16 are linked with respective horizontal planes provided to eliminate any burrs that may otherwise be formed in the process of molding the members.

Figure 8:
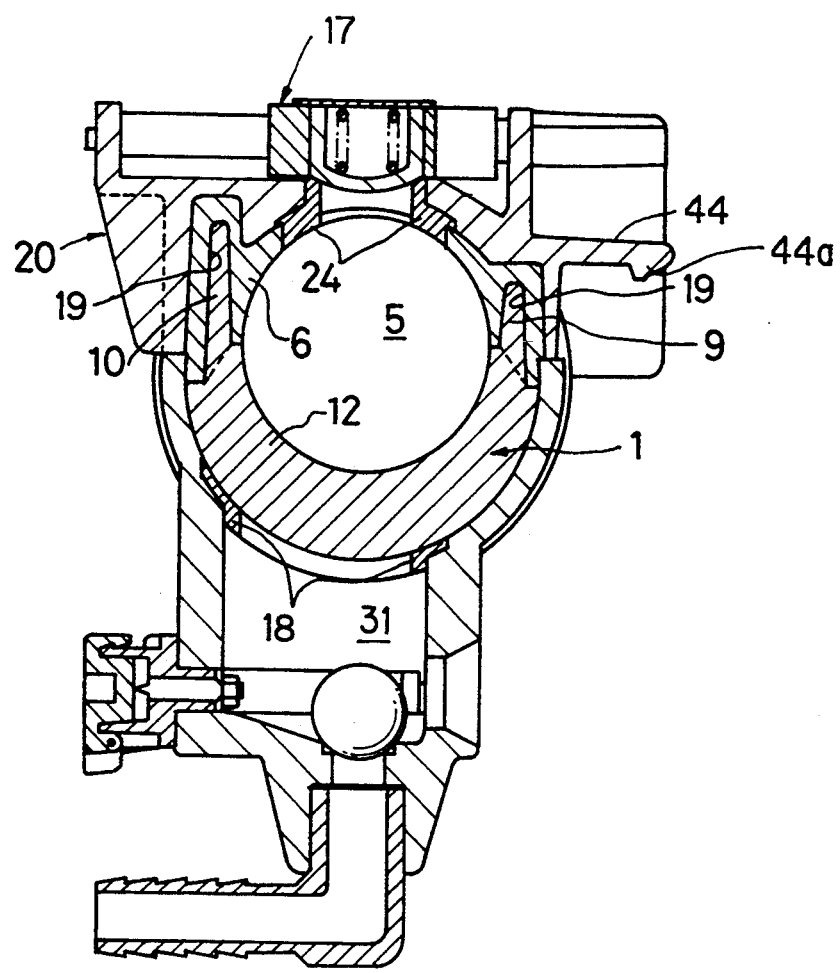
FIG. 8 is a sectional view of the offset adapter of FIG. 1 and a milk tap connected with each other.

FIG. 8 is a cross section of a milk tap 20 to which the embodiment of offset adapter 1 is fitted. The milk tap 20 is provided on its inner wall surface with a pair of grooves 19, 19 for receiving the respective ridges 9, 10 arranged on the outer peripheral surface of the upper member 3 for mutual engagement so that the aperture of the milk tap 20 and the aperture 2 of the offset adapter 1 may not become misaligned with each other by torsion or some other external force.

Reference numeral 24 denotes a sealing member (gasket) for securing an airtight arrangement of a slide valve 17 of the milk tap 20 in the aperture of the adapter 1. Because of the provision of the sealing member, the aperture 2 of the adapter 1 can be made to have a diameter greater than that of the corresponding aperture of the milk tap 20.

Reference numeral 18 denotes a gasket to be used with the offset adapter 1 for sealing a vacuum chamber 31 arranged under the milk tap 20.

With such an arrangement, as the milk tap 20 has a substantially cylindrical pipe guide hole within it, it may be fitted to a large diameter milk delivery pipe without using the adapter 1. On the other hand, if it is to be fitted to a small diameter milk delivery pipe, the operation of combining the milk tap 20 and the milk delivery pipe is carried out in the following manner. Firstly, the adapter 1 is fitted to the pipe by means of the gasket 24 in such a way that the aperture 2 of the upper member 3 of the adapter 1 is aligned with a corresponding aperture of the milk delivery pipe and then the lower member 4 is forced to engage the upper member 3 as the ridges 13, 14 of the lower member 4 are pushed into the respective grooves 7, 8 of the upper member 3 for mutual engagement.

Thereafter, the milk tap 20 is fitted to the adapter 1, using the gasket 18, and secured thereto by using appropriate means such as a hose band. Since the ridges 9, 10 on the outer peripheral surface of the upper member 3 of the adapter 1 engage the respective grooves 19, 19 on the inner wall surface of the milk tap 20 under this condition, the adapter 1 and the milk tap 20 are securely held to each other such that they properly communicate with each other as their apertures are not displaced from each other.

Figure 9:
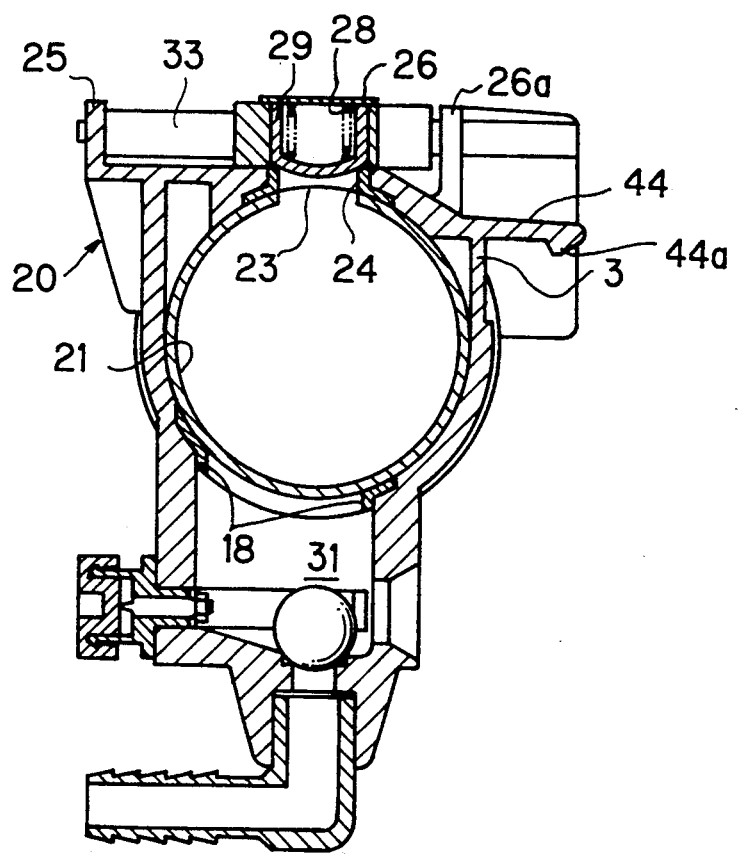
FIG. 9 is a sectional front view of an embodiment of a slide valve according to the invention fitted to a milk tap.
Figure 10:
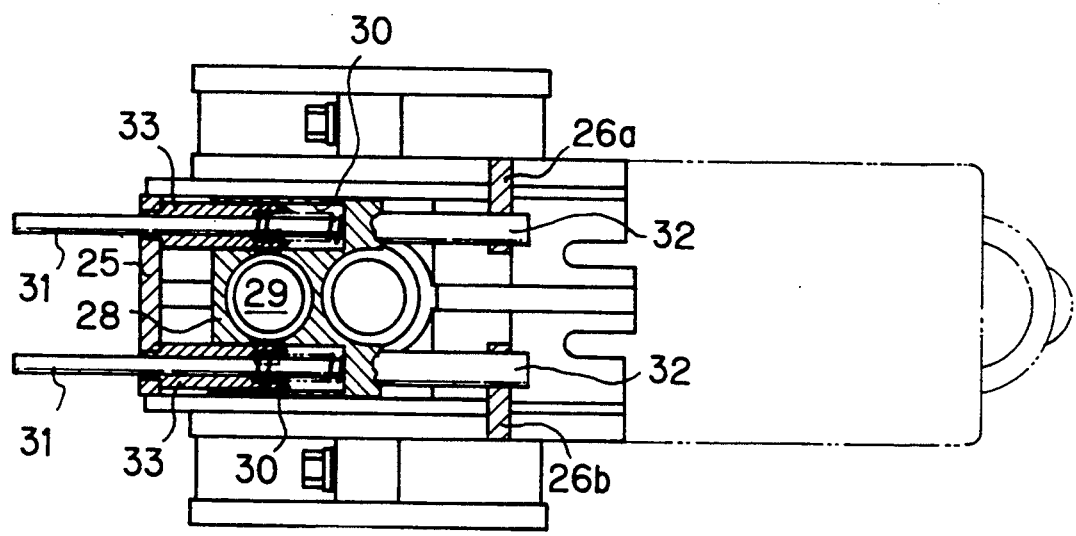
FIG. 10 is a sectional plan view of the slide valve of FIG. 9.
Figure 11:
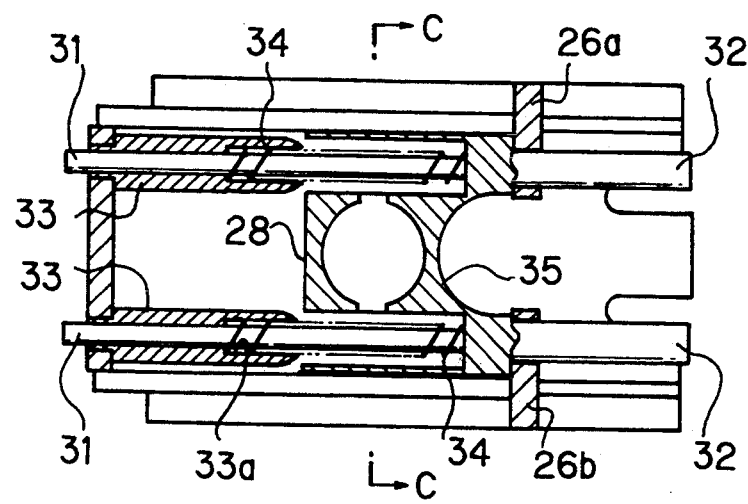
FIG. 11 is a sectional plan view of the slide valve of FIG. 9 located in a position where it completely closes the aperture of the milk tap.

FIG. 9 shows a milk tap fitted directly to a larger diameter milk delivery pipe 21 without using an adapter 1, said milk delivery pipe 21 comprising a number of openings 23, which are distributed with intervals along the pipe and each of which is sealed by a gasket 24 fitted to the circumferential rim of the opening, a milk tap 20 being fitted to the milk delivery pipe 21 with the interposition of one of the gaskets 24.

A holder 25 and a pair of holders 26a, 26b are oppositely arranged on the milk tap 20 with the opening 23 located therebetween. The holders 25, 26a and 26b are provided with respective guide holes. The holders 26a and 26b are separated from each other by a distance slightly larger than the outer diameter of an elbow pipe 58 of a plug-in metal fitting to be connected to the opening 23 of the milk delivery pipe 21 via the gasket 24 of the milk tap 20.

Figure 13:
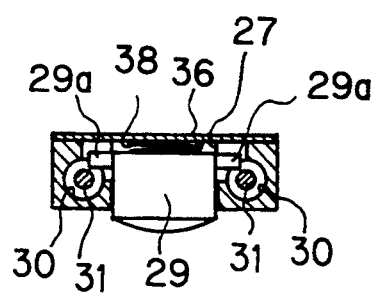
FIG. 13 is a sectional view of the slide valve taken along line C—C of FIG. 11.

Reference numeral 28 denotes a slide valve carriage slidably supported by the milk tap 20. The slide valve carriage 28 is provided with a substantially circular valve sliding hole 27 at the center thereof and a pair of transversal collar insertion holes 30, 30 are bored into the valve carriage 28 from a side toward the other side thereof along the lateral sides of the valve sliding hole 27. Note that, in this embodiment, the valve sliding hole 27 communicates with the holes 30 through notches that are arranged at regular intervals (FIG. 13) and a cylindrical valve 29 provided with a semispherical bottom and a pair of lugs 29a, 29b respectively at the upper and lower edges is disposed at the bottom of said valve sliding hole 27. Guide pins 31, 31 are projecting outwardly from the bottoms of the respective collar insertion holes 30, 30 and a pair of guides 32, 32 are projecting from the side of the valve carriage 28 opposite to that of the holes 30, 30. The length of the guide pins 31, 31 and that of the guides 32, 32 are such that the guide pins 31, 31 do not entirely come out of the guide holes of the holders 26a, 26b when the valve carriage 28 is mounted and made to abut the holders 26a, 26b and the guides 32, 32 are released when it is made to abut the holder 25.

A pair of collars 33, 33 are put around the respective guide pins 31, 31, each of said collars being tapered at the end close to the valve carriage 28 and having an openings 33a around the guide pin at the center of the tapered end of the collar to receive a coil spring 34 arranged between the opening 37a and the valve carriage 28 in order to constantly urge the latter toward the holders 26a, 26b. The collars 33, 33 preferably have such a length that, when an end of each of the collars is made to abut the holder 25, the other end is located slightly closer to tile holder 25 than the center of the valve 29 arranged in the carriage 28 to close the opening.

Reference numeral 35 denotes a semicircular notch or aperature formed in order for the milk tap 20 to slide with the valve carriage 28 as an elbow pipe is made to abut it.

Figure 12:
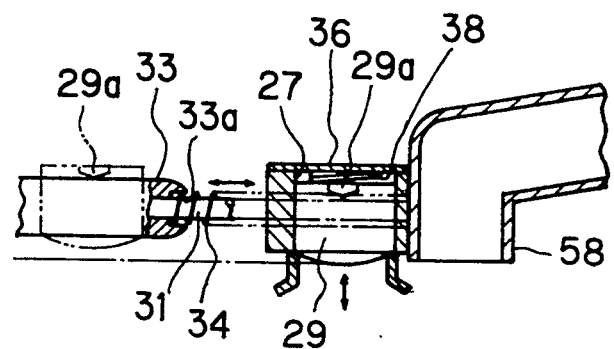
FIG. 12 is a sectional side view of the slide valve of FIG. 9, showing its movement.

The valve 29 of this embodiment is covered by a lid 36 when it is housed in the valve carriage 28 and urged downward by a coil spring 38. While the oppositely arranged lugs 29a, 29b of the valve 29 are tapered at the lower ends thereof in FIG. 12, although they may be slanted to a side or take any other appropriate shape.

With the slide valve of the embodiment having a configuration as described above, the collars 33, 33 are fitted to the respective guide pins 31, 31 with the coil springs 34, 34 arranged in place. Then, the guide pins 31, 31 are introduced into the respective guide holes of the holder 25 and the valve carriage 28 is pushed toward the holder 25 against the resilient force of the coil springs 34, 34 until the guides 32, 32 enter the respective guide holes. Then, the valve carriage 28 is driven to move toward the holders 26a, 26b by the resilient force of the coil springs 34, 34 until the aperture of the milk tap 20 is closed by the valve 29.

For mounting an elbow pipe 58 of a plug-in metal fitting onto the milk tap 20, the valve carriage 28 is pushed toward the holder 25 while holding the elbow pipe 58 in abutment with the semicircular notch 35 of the valve carriage 28. Then, the valve carriage 28 starts moving along the guide pins 31, 31 until the front ends of the collars 33, 33 abut the bottoms of the respective lugs 29a, 29b arranged at the lateral sides of the valve 29 in the collar insertion holes 30, 30, when the collars 33, 33 and the corresponding lugs 29a, 29b easily slide relative to each other because of their tapered profiles to consequently push up the valve 29 against the resilient force of the coil spring 38 such that the bottom of the valve 29 eventually leaves the aperture of the milk tap 20 and, at the same time, is held in a suspended state without touching the surface of the milk tap 20 while the valve carriage 28 is moving. An elbow pipe 58 of a plug-in metal fitting 45 can be linked with the milk delivery pipe 21 when the notch of the valve carriage 28 is aligned with the aperture.

For releasing the plug-in metal fitting 45 from the milk delivery pipe 21, the valve carriage 28 is moved toward the holders 26a, 26b as it is urged by the coil springs 34, 34 so that the lugs 29a, 29b of the valve 29 slide from the respective mounted positions on the collars 33 along the tapered surfaces until the valve 29 is pushed down by the resilient force of the coil spring 38 and the lugs 29a, 29b are completely moved away from the collars 33.

Figure 14:
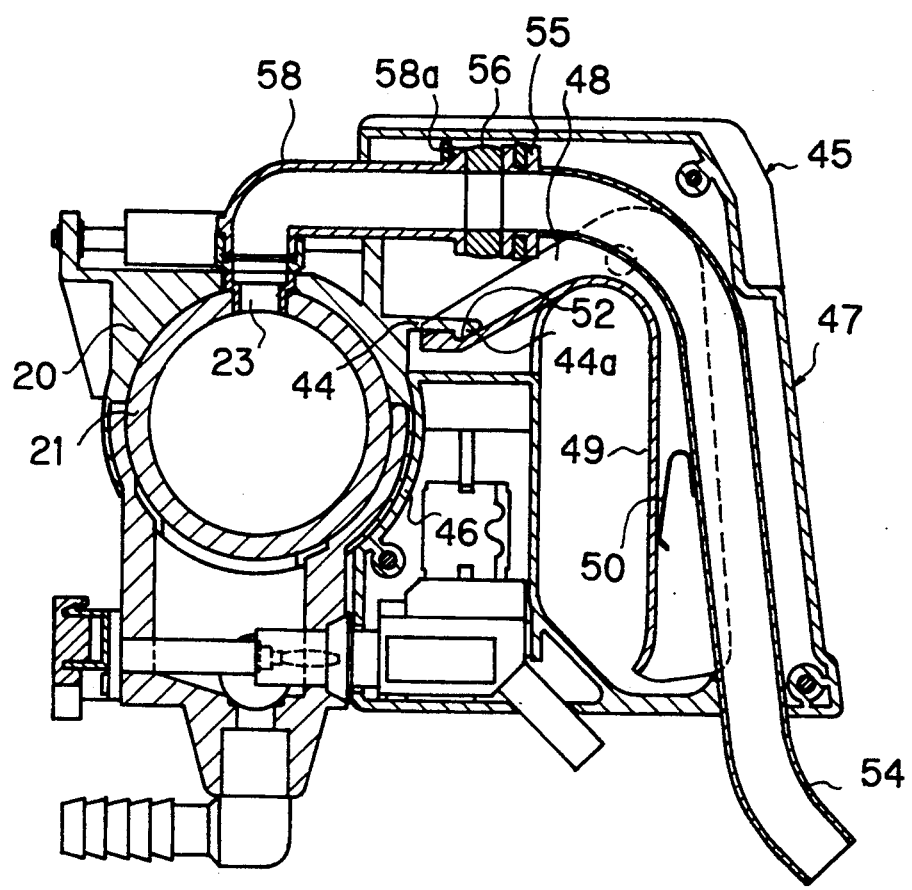
FIG. 14 is a longitudinal sectional view of a plug-in metal fitting according to the invention placed in position for connecting a milk tap and a milk delivery pipe.

FIG. 14 is a sectional view of the milk tap 20 and the plug-in metal fitting 45 linked with each other. The milk delivery pipe 21 has an opening 23 at the top and a milk tap 20 is fitted to the pipe 21 around the periphery of the opening 23, the aperture of the milk tap 20 of this embodiment being normally closed by the slide valve 29. A plate 44 is arranged adjacent to the milk tap 20 at a lateral side thereof, said plate 44 being provided at its lower end with a stepped projection 44a.

As described above, reference numeral 45 denotes a plug-in metal fitting to be linked with the milk tap 20. The metal fitting 45 has a curved connecting surface section 46 to be held in abutment with the lateral surface of the milk delivery pipe and an inverted L-shaped hand section 47 which is swingably held by a lever 48. The lever 48 has a grip 49 urged to turn clockwise by a leaf spring 50 and is provided at the free end with a notch 52 for engagement with the stepped projection 44a of the plate 44.

Figure 15:
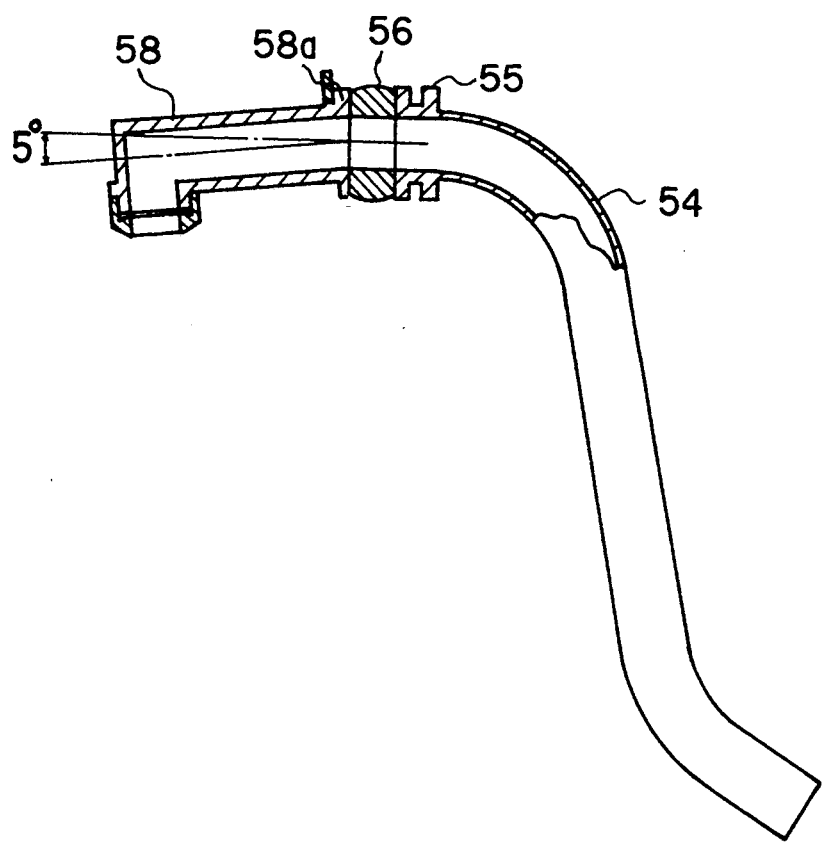
FIG. 15 is a front view of a milk delivery pipe and an elbow pipe connected thereto.

Reference numeral 54 denotes a milk tube extending through the hand section 47 of the plug-in metal fitting 45 and connected at an end to milking claws and at the other end with a flange 55. As seen in FIGS. 15 and 16, it is linked with the elbow pipe 58 by means of a ring-shaped rubber packing 56 and a flange 58a fitted to the opposite end of the elbow pipe 58.

Note that the flange 58a of the elbow pipe 58 has a large thickness and its axis is inclined downward by approximately 5° from the horizontal axis of the opening 23 of the milk delivery pipe 21 of the above embodiment.

Note also that a secure connection is established between the elbow pipe 58 and the milk tube 54 by means of members as shown in FIG. 16. More specifically, a pair of parallel guide plates 60, 60 are fitted to the flange 55 of the milk tube 54 and a pair of nuts 62, 62 are fitted to the ends of the respective guide plates 60, 60.

A pair of notched grooves 64, 64 are formed at the opposite lateral sides of the packing 56 and another pair of notched grooves 66, 66 are formed similarly at the opposite lateral sides of the flange 58a of the elbow 58, the packing 56 and the flange 58a being securely held by the guide plates 60, 60. An hoof-shaped ring 68 having an opening slightly larger than the outer diameter of the elbow pipe 58 is fitted to the side of the flange 58a of the elbow pipe 58 that is remote from the milk tube 54, said ring 68 being provided with a pair of oppositely disposed holes, through which respective bolts 70, 70 are introduced and made to engage with the respective nuts 62, 62.

While the flange 58a of the elbow pipe 58 is tapered such that the elbow pipe 58 is inclined relative to the axis of the milk tube 54 in the embodiment, the packing 56 of the flange 55 of the milk tube 54 may alternatively be tapered.

As described above in detail, with a pipe connecting structure to be used for a milk delivery pipe of a pipeline milker system according to the invention and comprising a metal fitting, the operator can connect the plug-in metal fitting to a milk delivery pipe 21 simply by pushing the metal fitting horizontally and perpendicularly to the axis of the milk delivery pipe 21, holding the lever 48 of the metal fitting with hand. Since the leading end of the elbow pipe 58 projecting upward from the plug-in metal fitting is pressed against the milk delivery pipe 21 under this condition, it slides with the slide valve 29 of the milk tap 20 to come into engagement with the aperture of the milk tap 20 and is pulled into the milk delivery pipe 21 by the vacuum in the pipe 21. As the operator release the lever 48 of the plug-in metal fitting 45 under this condition, the lever 48 is driven to turn clockwise by the leaf spring 50 until the notch 52 of the leading end of the lever 48 come to engage with the stepped projection 44a of the plate 44 of the milk tap 20 so that the metal fitting is rigidly and securely held to the milk delivery pipe 21.

When releasing the plug-in metal fitting 45 from the milk delivery pipe 21, the operator firstly holds the lever 48 of the hand section of the plug-in metal fitting 45. Then, the stepped projection 44a of the plate 44 of the milk tap 20 is disengaged from the notch 52 and consequently the opening 23 of the milk delivery pipe 21 and the leading end of the elbow 58 are separated from each other if the operator keeps on holding the lever 48. The slide valve 29 also slidingly moves under this condition and closes the aperture of the milk tap 20.

What is claimed is:

1. A pipe connecting structure constituted by a milk tap having an aperture to be aligned with a corresponding opening arranged at the top of a milk delivery pipe and a slide valve for opening and closing said aperture and a plug-in metal fitting removably fitted to said milk tap and including an elbow pipe, characterized in that said slide valve has an aperture to be aligned with the opening at the top of the milk delivery pipe and comprises a slide valve carriage having a substantially circular valve sliding hold disposed at the lower center and transversal collar insertion holes bored from a side toward the other side thereof and disposed along the lateral sides of the valve sliding hole, a pair of guide pins projecting outwardly from the bottoms of the respective collar insertion holes, a pair of guides projecting outwardly from said other side in a direction opposite to that of said guide pins, a pair of holders disposed oppositely and adjacent to the aperture of the milk tap for slidably holding said guides and guide pins and collars fitted to the respective guide pins of the valve carriage, coil springs being respectively arranged between the collars and the bottoms of the collar insertion holes, the leading ends of said collars disposed close to the carriage being tapered, a cylindrical valve being inserted into said valve sliding hole, said valve being provided with lugs at opposite sides thereof, the highest points of said collars fitted to said guide pins being located above the lowest points of the respective lugs, said lugs disposed at opposite sides of said cylindrical valve abutting the respective collars fitted to said guide pins when moved horizontally with the carriage.

2. A pipe connecting structure according to claim 1, characterized in that said cylindrical valve is urged downward by urging means.

3. A pipe connecting structure constituted by a milk tap having an aperture to be aligned with a corresponding opening arranged at the top of a milk delivery pipe and a slide valve for opening and closing said aperture and a plug-in metal fitting removably fitted to said milk tap and including an elbow pipe, characterized in that said plug-in metal fitting is designed to abut a lateral side of the milk delivery pipe in use, said metal fitting comprising a milk tube having an end to be connected to milking claws and another end to be connected to an elbow pipe by way of a ring-shaped packing, said elbow being inclined downward by 5° from the horizontal axis of the milk delivery pipe when connected to said metal fitting.

4. A pipe connecting structure according to claim 3, characterized in that the connection of said milk delivery pipe and said elbow pipe is realized by holding the ring-shaped packing between a first flange disposed at an end of said tube and a second flange disposed at a corresponding end of said elbow pipe, said elbow being inclined downward by 5° from the horizontal axis of the milk delivery pipe when connected to said metal fitting.

5. A pipe connecting structure constituted by a milk tap having an aperture to be aligned with a corresponding opening arranged at the top of a milk delivery pipe and a slide valve for opening and closing said aperture and a plug-in metal fitting removably fitted to said milk tap and including an elbow pipe, characterized in that said milk tap is connected to the milk delivery pipe by means of an offset adapter comprising a substantially cylindrical body having an outer diameter equal to the diameter of the pipe inlet port of a the milk tap, a circular milk delivery pipe inlet port disposed on a lateral side of said body and off the axis and toward the periphery thereof and having a desired diameter and an aperture disposed at the center of the top of said body, said body being formed by an upper member and a lower member, one of said members having ridges disposed on the longitudinal ends of the member abutting the corresponding ends of the other member, said other member having grooves disposed on the longitudinal ends of the member for receiving said ridges.

6. A pipe connecting structure according to claim 5, characterized in that said cylindrical body formed by said upper and lower members is hollow and comprises radial ribs extending inwardly to support the milk delivery pipe, which is introduced through said milk delivery pipe inlet port.

7. A pipe connecting structure according to claim 5, characterized in that said cylindrical body of the offset adapter comprises substantially parallel outward ridges projecting from the outer peripheral surface of the body designed to be received in corresponding grooves formed on the inner wall surface of the milk tap to ensure a secure engagement of the adapter and the milk tap.

* * * * *